Dec. 2, 1930.  I. C. JENNINGS  1,783,427
SEALING DEVICE FOR CENTRIFUGAL PUMPS
Filed Aug. 11, 1924   2 Sheets-Sheet 1
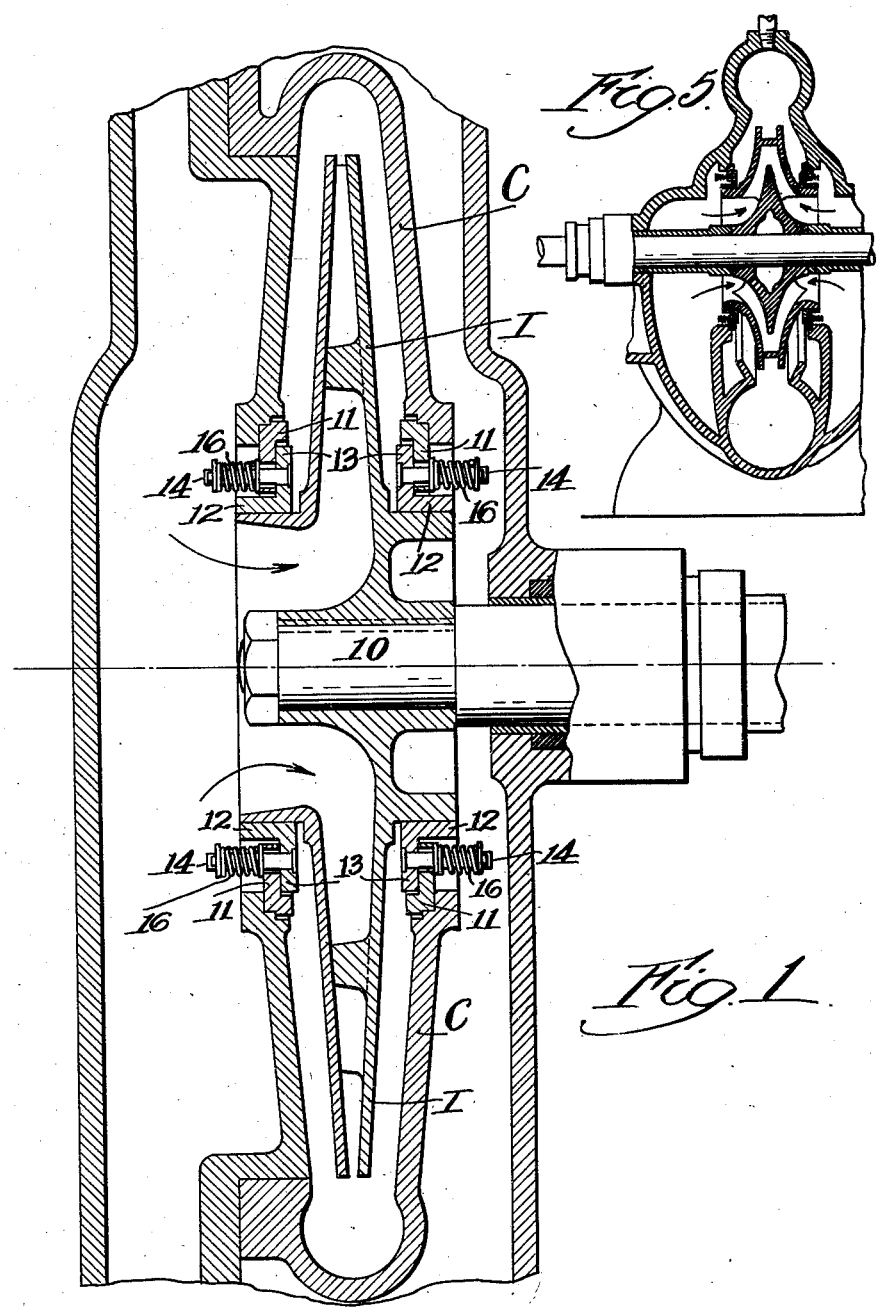

Dec. 2, 1930.  I. C. JENNINGS  1,783,427
SEALING DEVICE FOR CENTRIFUGAL PUMPS
Filed Aug. 11, 1924  2 Sheets-Sheet 2
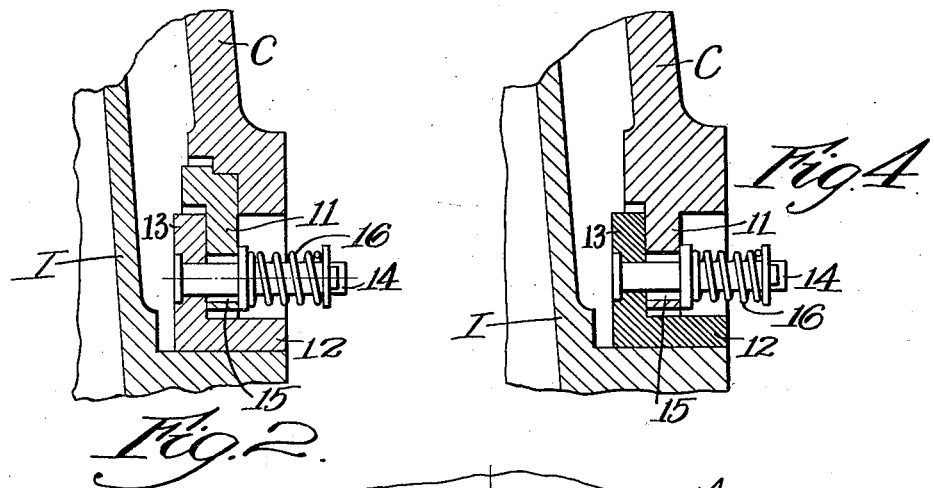
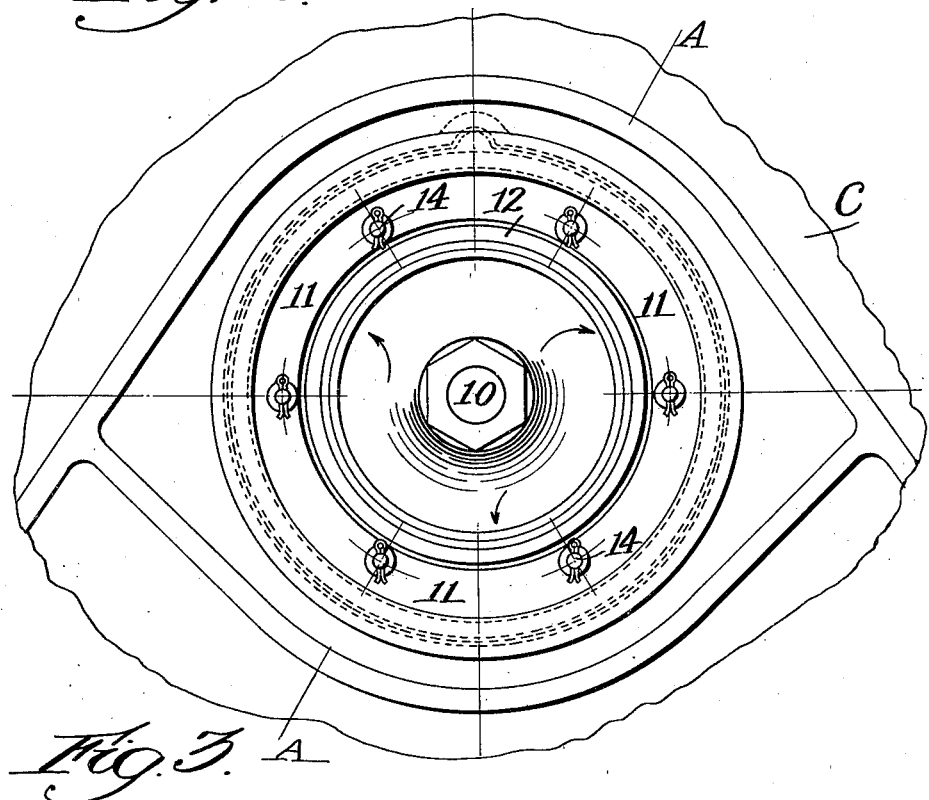
INVENTOR
Irving C. Jennings.
BY Southgate & Southgate
ATTORNEYS.

Patented Dec. 2, 1930

1,783,427

UNITED STATES PATENT OFFICE

IRVING C. JENNINGS, OF SOUTH NORWALK, CONNECTICUT

SEALING DEVICE FOR CENTRIFUGAL PUMPS

Application filed August 11, 1924. Serial No. 731,287.

The object of this invention is to provide a new and improved sealing device for centrifugal pumps. A centrifugal pump consists of an impeller, made up of a rotor having passages therethrough, which is rotated in a casing, the parts being arranged so that the liquid will enter the side or sides of the impeller and will be thrown by centrifugal action out at the periphery thereof. It is necessary to seal the impeller at its sides to the casing. This is generally done by fitting each hub of the impeller into a wearing ring fixed rigidly in the casing, through which the shaft of the impeller passes. It is difficult to get accurate alignment with the driving motor with this construction with a reasonably close fit in the bearing parts, without a great deal of work in assembling and adjusting.

To overcome this objection I have provided the following construction—A bearing flange preferably is removably secured in the casing and a sealing ring is fitted on the impeller, which sealing ring has a flange engaging the casing flange sideways and so as to have radial play or adjustment thereon. This permits the sealing ring to float and find its true concentric position as it is rotated. The sealing ring is preferably held in engagement with the casing flange by means of pins secured in the ring and passing loosely through the flange and carrying springs and the parts are so arranged that after the ring has assumed its two concentric positions, as the pump is started in operation, the liquid pressure due to the action of the impeller will force the sealing ring tightly into contact with the casing flange to make a tight joint. Thus, the sealing ring can center itself and in operation will provide an effective seal. This construction is preferably used on both sides of the impeller.

The invention is illustrated in the accompanying two sheets of drawings, in which Fig. 1 is a cross-sectional view taken on the line A—A of Fig. 3, showing an impeller arranged in a casing and having my improvement applied thereto;

Fig. 2 is a view on an enlarged scale illustrating the sealing device;

Fig. 3 is a side elevation of the sealing parts on the same scale as Fig. 2;

Fig. 4 is a view similar to Fig. 2 illustrating a slightly modified construction, and Fig. 5 is a view similar to Fig. 1 on a reduced scale showing my invention applied to another form of centrifugal pump.

Referring to the drawings and in detail, C designates the casing and I the impeller of an ordinary form of centrifugal pump. The impeller is formed with or mounted upon a shaft 10 which can be rotated by an electric motor or by any other suitable means. The impeller has passages through the same so the liquid will enter laterally therein and be thrown out at the periphery thereof into the volute of the pump casing.

The sealing device at one side of the impeller will now be described. A flange 11 is arranged in the casing. The flange may be made as a separate ring and pressed into the casing as shown in Fig. 2, which is the preferred construction; or it may be made as an integral part of the casing, as shown in Fig. 4. A sealing ring or bearing 12 is accurately fitted on the hub of the impeller and is slidable axially thereon. This ring has an extending flange 13 which engages the casing flange 11 sideways and so that it can have radial play or adjustment thereon. Pins 14 are secured in the flange 13 and project through holes 15 in the flange 11, these holes being larger in diameter than the diameter of the pins, so that the pins will pass freely through the flange 11. Springs 16 are arranged between washers mounted on each pin and are held in place thereon by suitable cotter-pins. These springs will keep the sealing ring 12 lightly in sidewise engagement with the casing flange 11. This sealing construction is used at each side of the impeller as illustrated.

When the impeller is started in rotation, the sealing rings will center exactly on the casing flanges, the light spring pressure between these parts permitting this action and as the impeller generates pressure in the volute by its rotation, the liquid will force the sealing rings outwardly relatively to the impeller and thus will make a tight seal. The rings and flanges can be easily replaced in case of wear.

The invention is shown in Fig. 1 as applied to an impeller in which the liquid enters on one side only thereof.

The invention is shown in Fig. 5 as applied to an impeller in which the liquid enters on both sides, this impeller in this construction being usually mounted in a casing which is split or divided horizontally.

The sealing device can be applied to many other forms of centrifugal pump and the details herein shown and described may be greatly varied by a skilled mechanic without departing from the scope of my invention as expressed in the claims.

Having thus fully described my invention, what I claim and desire to secure by Letters Patent is:—

1. In a centrifugal pump, the combination of a casing, an impeller running therein and a sealing device between the impeller and casing, said sealing device comprising a flanged bearing ring removably secured to a wall of said casing adjacent the hub of the impeller and a flanged sealing ring mounted on the hub of the impeller and slidable axially thereon, the flange of the sealing ring engaging the flange of the bearing ring in a plane perpendicular to the axis of the impeller and having radial clearances relative thereto permitting radial play or adjustment of said sealing ring thereon, and said sealing ring being exposed to the pressure generated by the impeller in said casing so that such pressure will force the sealing ring axially into tight surface engagement with the flange of the bearing ring.

2. The combination in a centrifugal pump as set forth in claim 1, in which a plurality of pins are rigidly secured in spaced relation in the flange of the sealing ring, in which holes are formed in the flange of the bearing ring of greater diameter than said pins and through which said pins pass freely, and in which springs are provided on the pins effective to draw the sealing ring into surface engagement with the flange of the bearing ring.

In testimony whereof I have hereunto affixed my signature.

IRVING C. JENNINGS.